(12) United States Patent
Reiser et al.

(10) Patent No.: US 7,058,759 B1
(45) Date of Patent: Jun. 6, 2006

(54) CONFIGURING A DISK DRIVE TO SUPPORT A TARGETED STORAGE FORMAT

(75) Inventors: Steven M. Reiser, Aliso Viejo, CA (US); William G. Infield, Costa Mesa, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 659 days.

(21) Appl. No.: 10/404,990

(22) Filed: Mar. 31, 2003

(51) Int. Cl.
*G06F 12/00* (2006.01)

(52) U.S. Cl. .................................... 711/112
(58) Field of Classification Search ............... None
See application file for complete search history.

(56) References Cited

U.S. PATENT DOCUMENTS 6,314,072 B1 * 11/2001 Ohmi .................. 369/53.41
2002/0103981 A1 * 8/2002 Smith et al. ............ 711/162
2003/0149852 A1 * 8/2003 Kang ..................... 711/164

\* cited by examiner

*Primary Examiner*—Pierre M. Vital
(74) *Attorney, Agent, or Firm*—Ramin Mobarhan, Esq.

(57) ABSTRACT

A method is disclosed for configuring a disk drive to support a targeted storage format for at least one surface of a disk on the disk drive, wherein the disk drive comprises a disk drive control system for executing a first firmware code image corresponding to the targeted storage format. The method includes receiving in the control system a format-selection parameter relating to a format-specific code portion selected from a plurality of format-specific sub-portions wherein each sub-portion corresponds to a specific storage format. The method further includes configuring the firmware code image by the control system from the selected format-specific sub-portion and a second code portion wherein the second code portion is executable by the control system for each of the format-specific sub-portions; and executing the configured firmware code image by the control system wherein the executing configures the control system to support the targeted storage format.

20 Claims, 6 Drawing Sheets

CONFIGURING A DISK DRIVE TO SUPPORT A TARGETED STORAGE FORMAT

FIELD OF THE INVENTON

This invention relates to data storage formats for disks in a disk drive. More particularly, the present invention is directed to methods for configuring a disk drive to support a targeted storage format for a surface of a disk on a disk drive.

BACKGROUND OF THE INVENTON

Since the inception of the data storage disks, the industry has pushed towards higher and higher data storage densities by increasing the number of tracks per inch, the bits per track, or both on the storage of data on disks. Currently, once a disk drive has been assembled, it undergoes a formatting process in which the disk drive is configured to support a desired storage format. Typically, during the formatting process, a disk drive is placed in a test system, such as a single-plug tester (SPT), that is in communication with a remote host, such as a main frame computer which monitors the operations of the tester. To configure a disk drive to support a desired format, an image of the format is downloaded from the host in the test system and to the disk drive. The disk drive is then configured to the downloaded format so that the format can be supported by the disk drive.

Due to various factors such as an underperforming head or other characteristic defects of the disk drive arising from the manufacturing process, it may be desired to choose an alternate storage format to be supported by the disk drive. The foregoing may occur, for example after an initially desired storage format has been deemed to be unsuitable for a particular disk drive. This however, necessitates that a new formatting image be downloaded from the host into the test system. Should the newly downloaded image be also deemed unsuitable, then yet another image has to be downloaded from the host, with the process repeating until a suitable format is found or the disk drive is removed from the formatting process. The host is therefore required to be provided with an array of pre-configured format-images, allocate a generally large memory area for storage of all the pre-configured format-images, and to download each image to the test system upon request. Due to the inherently large size of most formatting images, delays in the overall formatting process may also occur each time an image is being transmitted from the host to the test system and the disk drive. The problem is further exacerbated since the host is often in charge of a large number of test systems and disk drives undergoing the formatting process at the same time.

Accordingly, what is needed is a method that allows for availability of various format images to be used in the configuration of a disk drive without the need for the storage and downloading of the images from a host computer.

SUMMARY OF THE INVENTION

This invention can be regarded as a method for configuring a disk drive to support a targeted storage format for at least one surface of a disk on the disk drive, wherein the disk drive having at least one disk and a disk drive control system for executing a first firmware code image corresponding to the targeted storage format. The method includes installing a first code portion in the disk drive, the code portion having a plurality of format-specific sub-portions wherein each sub-portion corresponds to a specific storage format, installing a second code portion in the disk drive, wherein the second code portion is executable by the disk drive control system for each of the format-specific sub-portions.

The method further includes receiving a first format-selection parameter by the control system, wherein the first format-selection parameter relates to a selected first format-specific sub-portion and causes the control system to configure the first firmware code image from the second code portion and the selected first format-specific sub-portion, and initializing the control system to execute the configured first firmware code image wherein the execution configures the control system to support the targeted storage format.

This invention can also be regarded as a method of manufacturing a disk drive wherein a remote host causes the configuring of the disk drive to support a targeted storage format for at least one surface of a disk on the disk drive, wherein the disk drive has at least one disk and a disk drive control system for executing a first firmware code image corresponding to the targeted storage format. The method includes installing a first code portion in the disk drive, the first code portion having a plurality of format-specific sub-portions wherein each sub-portion corresponds to a specific storage format; and installing a second code portion in the disk drive, wherein the second code portion is executable by the disk drive control system for each of the format-specific sub-portions.

The method further includes selecting a first format-selection parameter by the remote host wherein the first format-selection parameter relates to a selected first format-specific sub-portion; receiving the first format-selection parameter by the control system from the remote host wherein the first format-selection parameter causes the control system to configure the first firmware code image from the second code portion and the selected first format-specific sub-portion, and initializing the control system to execute the configured first firmware code image wherein the execution configures the control system to support the targeted storage format.

This invention can also be regarded as a method for configuring a disk drive to support a targeted storage format for at least one surface of a disk on the disk drive, wherein the disk drive comprises a disk drive control system for executing a first firmware code image corresponding to the targeted storage format. The method includes receiving in the control system a format-selection parameter relating to a format-specific code portion selected from a plurality of format-specific sub-portions wherein each sub-portion corresponds to a specific storage format.

The method further includes configuring the firmware code image by the control system from the selected format-specific sub-portion and a second code portion wherein the second code portion is executable by the control system for each of the format-specific sub-portions; and executing the configured firmware code image by the control system wherein the executing configures the control system to support the targeted storage format.

DETAILED DESCRIPTION OF THE INVENTION

Figure 1:
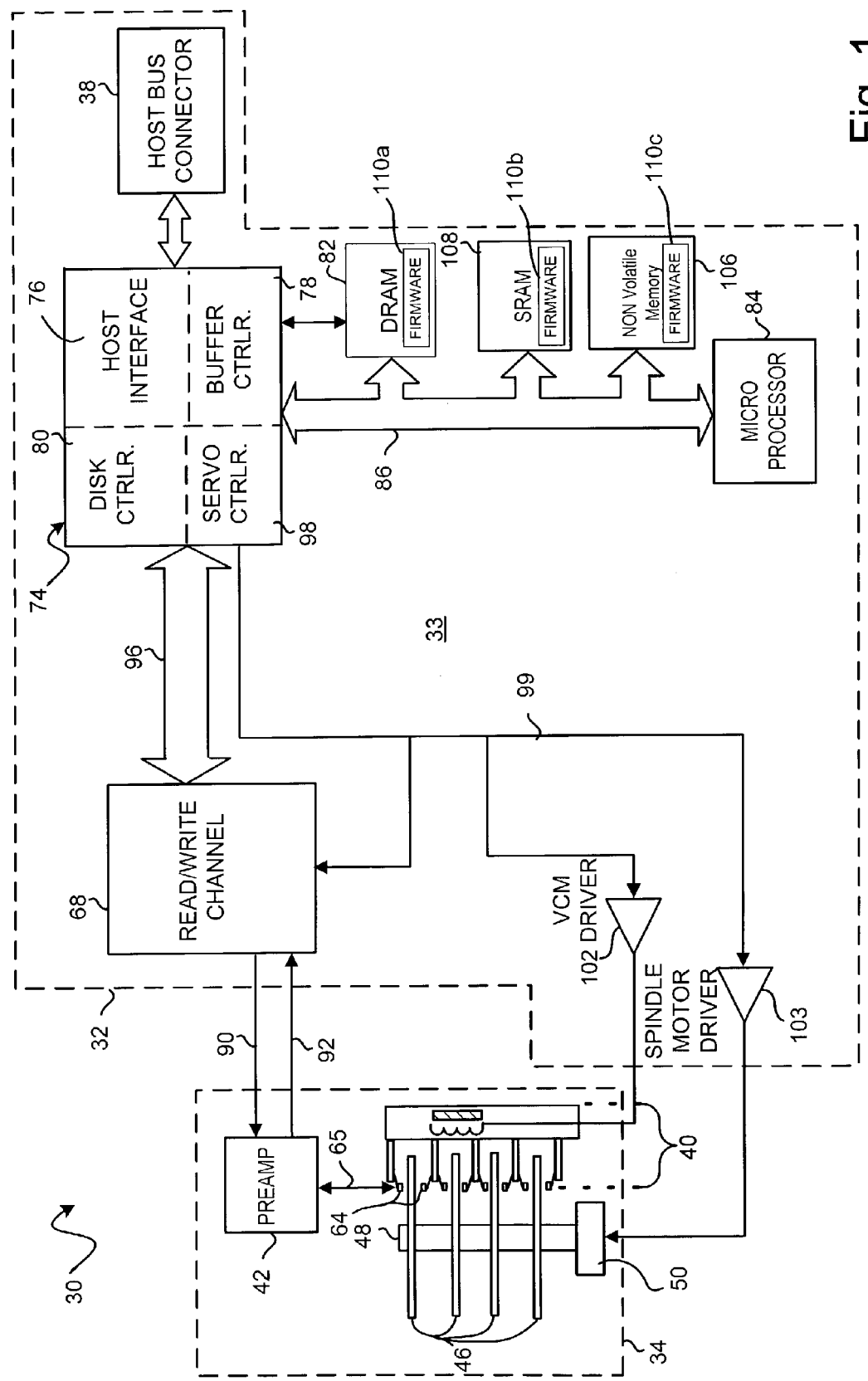
FIG. 1 is a block diagram of a disk drive in which the invention may be practiced.

With reference to FIG. 1, a block diagram of a disk drive 30 is shown in which the invention may be practiced. Disk drive 30 is connectable to a host computer (not shown) via host bus connector 38 for the transfer of commands, status and data. One suitable standard for such connection is the Advanced Technology Attachment (ATA) standard presently favored for desktop personal computers. Disk drive 30 comprises a Head Disk Assembly (HDA) 34, and a disk drive control system 33 mounted on a printed circuit board assembly PCBA 32.

As shown in FIG. 1, HDA 34 comprises one or more disks 46 for data storage; a spindle motor 50 for rapidly spinning each disk 46 (four shown) on a spindle hub 48; and an actuator assembly 40 for swinging heads 64 in unison over each disk 46. The heads 64 are connected to a preamplifier 42 via a trace assembly 65 for reading and writing data on disks 46. Preamplifier 42 is connected to channel circuitry in control system 33 via read data line 92 and write data line 90.

The control system 33 comprises a read/write channel 68, host interface and disk controller (HIDC) 74, voice coil motor driver (VCM) 102, spindle motor driver (SMD) 103, microprocessor 84, and several memory arrays such as dynamic random access memory (DRAM) 82, static random access memory (SRAM) 108, and non-volatile memory 106. A serial bus 99 provides a medium for bi-directional transfer of digital data for programming and monitoring channel 68, VCM driver 102 and SMD 103. Host-initiated operations for reading and writing data in disk drive 30 are executed under control of microprocessor 84 connected to the controllers and memory arrays via a bus 86. Program code executed by microprocessor 84 comprises firmware 110 which may be stored collectively as portions 110a, 110b and 110c in memory arrays DRAM 82, SRAM 108 and non-volatile memory 106 respectively. DRAM 82 may also serve as a cache memory for data read from or written to the disk as is well known in the art. Firmware 110 may be stored as program overlay code on reserved tracks of disks 46 and loaded into DRAM 82 or SRAM 108 as required for execution.

During disk read and write operations, data transferred by preamplifier 42 is decoded and encoded by read/write channel 68. During read operations, channel 68 decodes data into digital bits transferred on an NRZ bus 96 to HIDC 74. During write operations, HIDC 74 provides digital data over the NRZ bus 96 to read/write channel 68 which encodes the data prior to its transmittal to preamplifier 42.

The HIDC 74 comprises a disk controller 80 for formatting and providing error detection and correction of disk data, a host interface controller 76 for responding to commands from host 36, and a buffer controller 78 for storing data which is transferred between disks 46 and host (not shown). Collectively the controllers in HIDC 74 provide automated functions which assist microprocessor 84 in controlling disk operations.

The servo controller circuit 98 in HIDC 74 provides an interface between microprocessor 84 and actuator assembly 40 and spindle motor 50. Microprocessor 84 commands logic in servo controller 98 to position actuator 40 using a VCM driver 102 to precisely control the rotation of spindle motor 50 with a spindle motor driver 103.

Suitably, disk drive 30 employs a sampled servo system in which equally spaced servo wedge sectors (sometimes termed "servo wedges") are recorded on each track of each disk 46. Data sectors are recorded in the intervals between servo sectors on each track. Servo sectors are then sampled at regular intervals to provide servo position information to microprocessor 84. Servo sectors are thereafter received by channel 68, and are processed by servo controller 98 to provide position information to microprocessor 84 via bus 86.

Figure 2:
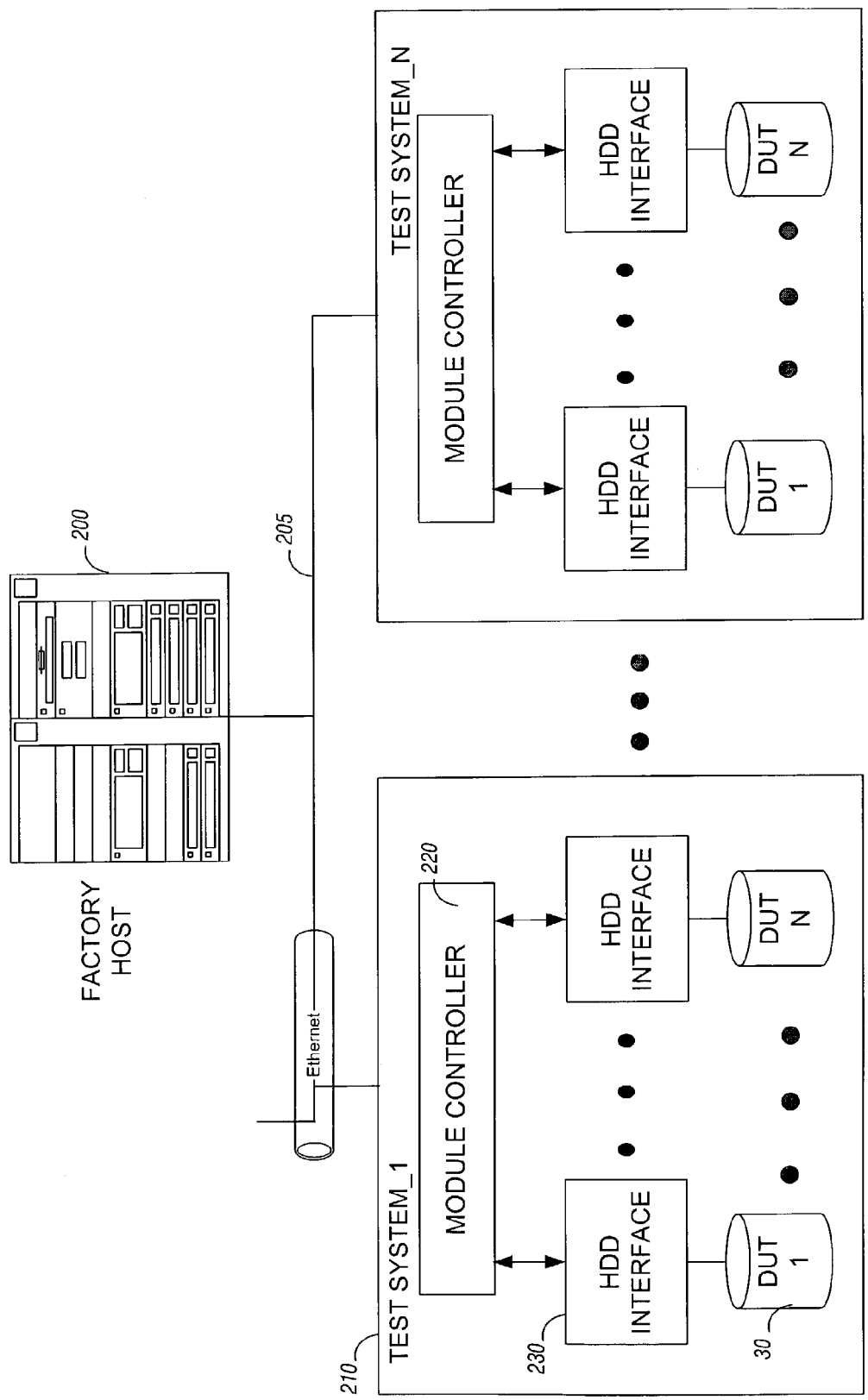
FIG. 2 is a block diagram of a factory test environment in which the invention may be practiced.

With reference to FIG. 2, a block diagram of a factory test environment in which the various embodiments of the present invention maybe practiced is illustrated. As shown, a factory host 200, such as a main-frame computer, is in communication with one or more test systems 210, such as a Single Plug Tester (SPT), via a communication medium 205, such as an Ethernet-based factory network. A test system 210 generally comprises a module controller 220, such as a microprocessor, and associated HDD-interface circuitry 230 for interfacing with one or more of disk drives 30 under test (DUT). In this way, the factory host 200 monitors the operations of each test system 210 during the testing of disk drives 30.

Figure 3:
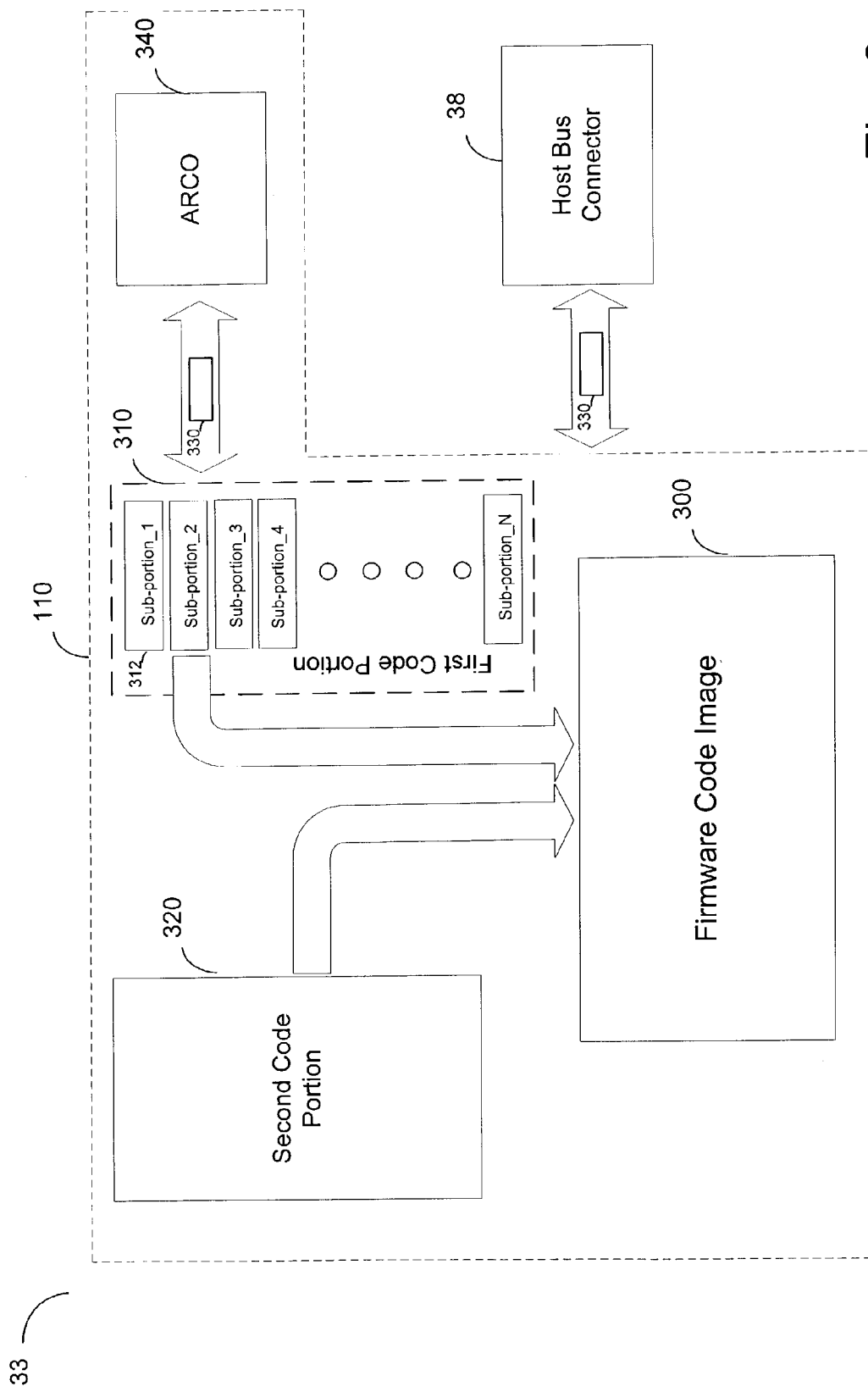
FIG. 3 is a block diagram illustrating an embodiment of the invention.
Figure 4:
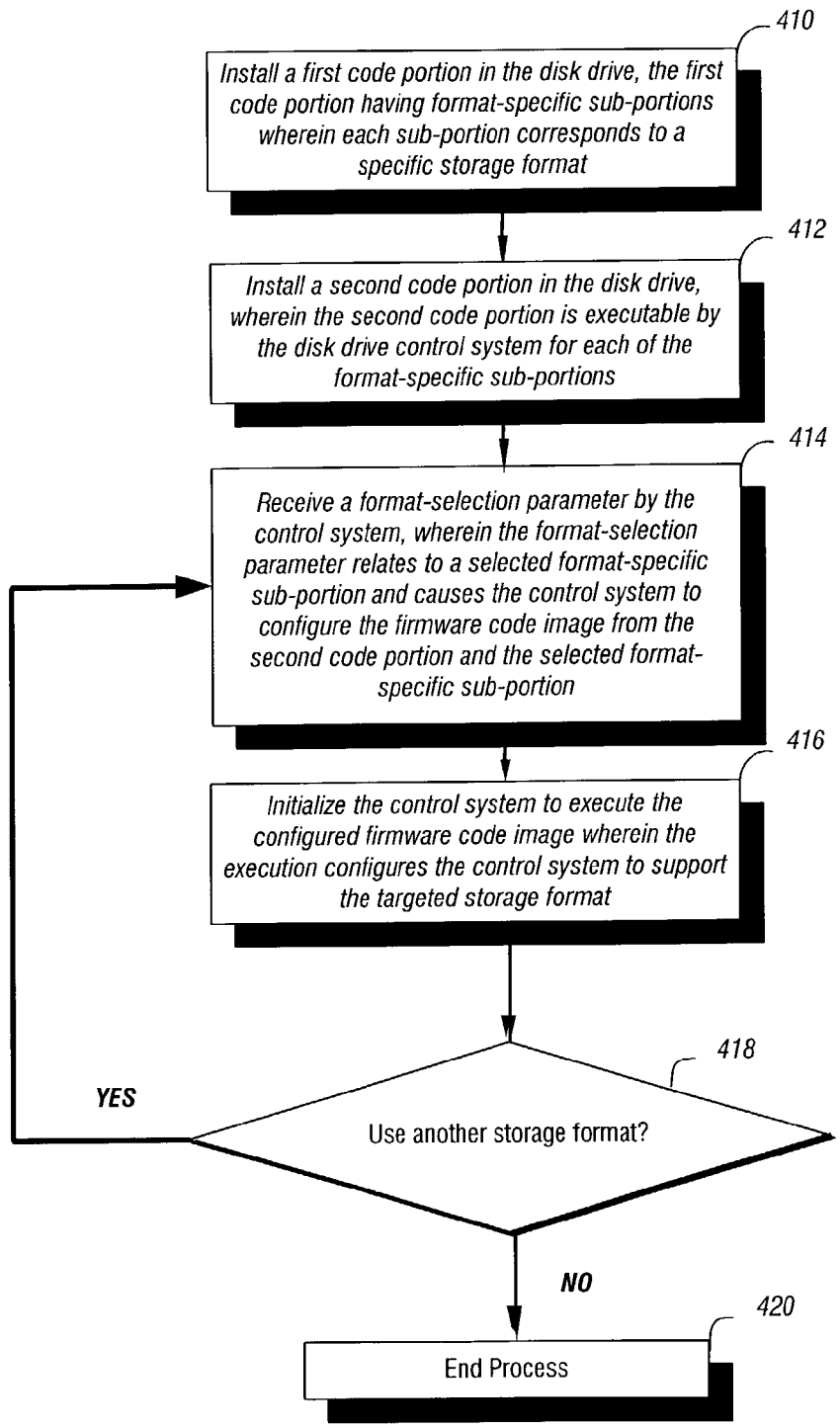
FIG. 4 is a flow chart illustrating a process used in an embodiment of the invention.

Referring to FIG. 4 in conjunction with FIG. 3, a method for configuring a disk drive 30 to support a targeted storage format for at least one surface of a disk 46 (shown in FIG. 1) on the disk drive 30 is disclosed. As shown in FIG. 3, the disk drive 30 comprises a disk drive control system 33 for executing a firmware code image 300 corresponding to the targeted storage format.

Starting at block 410 of FIG. 4, the method includes installing a first code portion 310 in the disk drive 30. The first code portion 310 comprises a plurality of format-specific sub-portions 312, such as sub-portion_1 through sub-portion_N, where each sub-portion 312 corresponds to a specific storage format. Next, in block 412, a second code portion 320 is installed in the disk drive 30, wherein the second code portion 320 is executable by the disk drive control system 33 for each of the format-specific sub-portions 312. In one embodiment, the first code portion 310 and the second code portion 320 are installed in firmware 110 of the control system 33 as shown in FIG. 3.

Next, in block 414, a format-selection parameter 330 is received by the control system 33. The format-selection parameter 330 relates to a selected format-specific sub-portion 312, such as sub-portion_2, and causes the control system 33 to configure the firmware code image 300 from the second code portion 320 and the selected format-specific sub-portion 312, such as sub-portion_2. In one embodiment of the invention, format-selection parameters 330 are received by the control system 33 from a remote source. In one embodiment, the remote source is a remote host such as the factory host 200 communicating with the control system 33 via host bus connector 38. In another embodiment, the remote source is a local host, such as the module controller 220. In one embodiment, the format-selection parameters 330 are received with a vendor specific command. In another embodiment, the format-selection parameters 330 are received by the control system 33 from a characterization process executing on the disk drive 30, such as the Adaptive Read Channel Optimization (ARCO) 340. ARCO 340 comprises firmware used to determine, for each head/surface, optimum preamplifier and read channel register settings by zone corresponding to a targeted format. The settings are determined experimentally by adjusting variable parameters and observing results such as error rate. Such parameters may include but are not limited to MR head bias, jog, write current, and filter response.

Next, in block 416, the control system 33 is initialized to execute the configured firmware code image 300, with the execution configuring the control system 33 to support the targeted storage format. In one embodiment of the invention, the storage format is determined by a bit per inch storage parameter. In another embodiment, the storage format is determined by a disk-storage capacity parameter. In yet another embodiment the storage format is determined by a track per inch storage parameter. The self-servo writing details and advantages associated with the use of a track per inch storage parameter are described in the U.S. Pat. No. 5,541,784 entitled "Bootstrap method for writing servo tracks on a disk drive", herein incorporated by reference.

Next, in decision block 418, it is determined whether another storage format maybe needed for the disk drive 30. If another storage format is needed, then the process flow returns to block 414, wherein a second format-selection parameter 330 is received by the control system 33. The second format-selection parameter 330 relates to a second selected format-specific sub-portion 312, such as to sub-portion_3, and causes the control system 33 to configure a second firmware code image 300 from the second code portion 320 and the selected second format-specific sub-portion 312. Next, in block 416, the control system 33 is initialized to execute the second configured firmware code image 300.

Returning to decision block 418, if it is determined that another storage format is not needed for the disk drive 30, such as because the configuration of the control system 33 was successful or the disk drive 30 is being removed from the configuring process, then the flow proceeds to block 420 in which the process ends.

One advantage of the foregoing feature of the present invention over the prior art is that by installing on the disk drive 30 the first and second code portions from which the firmware image code 300 is configured, the need for the downloading of the firmware image codes from the factory host 200 is minimized. In addition, by configuring each firmware image code 300 from the first and second code portions on a per need basis, the otherwise need for pre-configuring all versions of the firmware image code 300 and allocation of a much larger memory area for their storage can be minimized.

Figure 5:
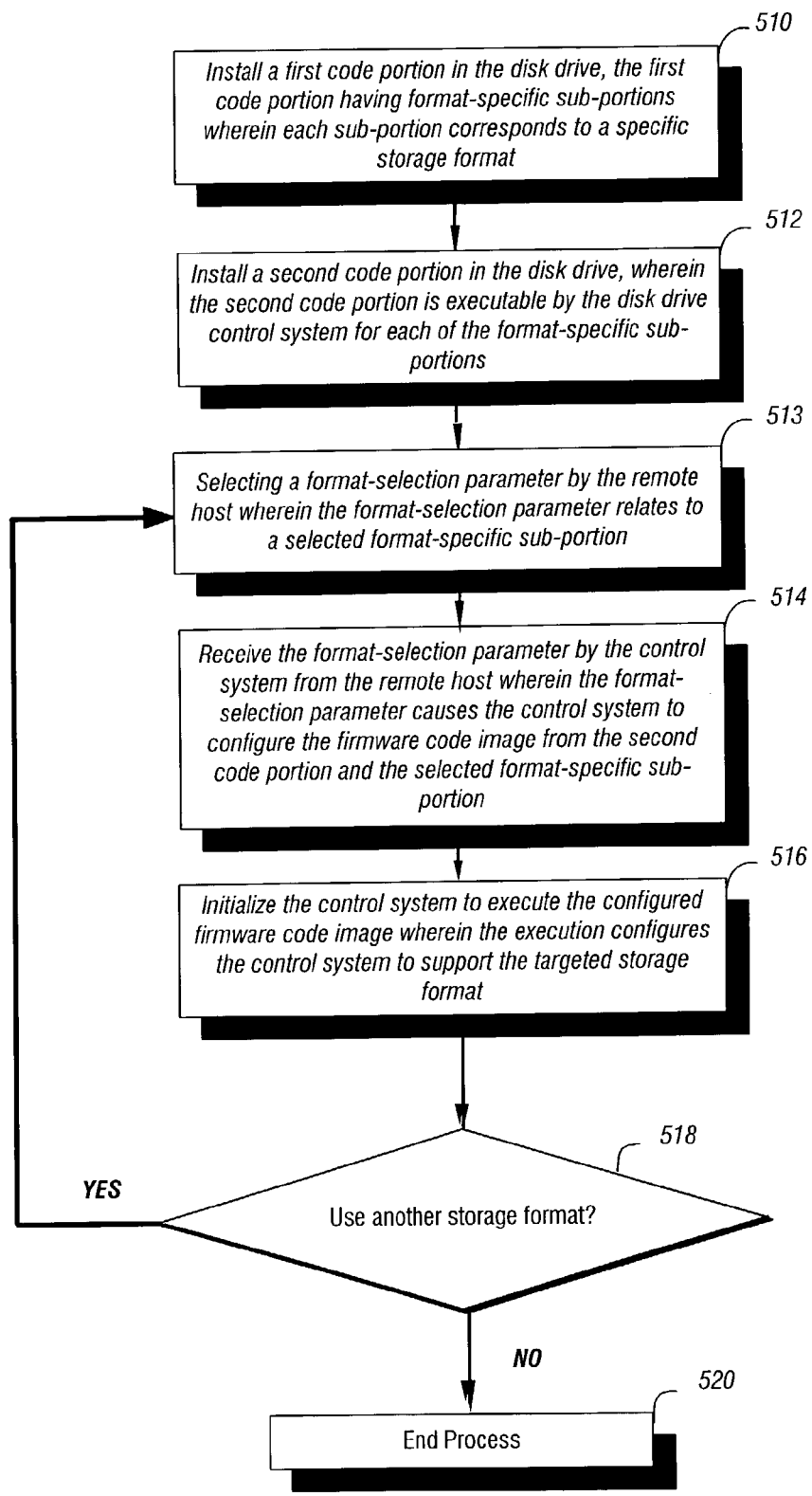
FIG. 5 is a flow chart illustrating a process used in another embodiment of the invention.

Referring to FIG. 5 in conjunction with FIG. 3, a method of manufacturing a disk drive 30 is disclosed in which a remote host, such as the factory host 200 (shown in FIG. 2), causes the configuring a disk drive 30 to support a targeted storage format for at least one surface of a disk 46 on the disk drive 30. As shown in FIG. 3, the disk drive 30 comprises a control system 33 for executing a firmware code image 300 corresponding to the targeted storage format.

Starting at block 510 of FIG. 5, the method includes installing a first code portion 310 in the disk drive 30, the first code portion 310 comprises a plurality of format-specific sub-portions 312, such as sub-portion_1 through sub-portion_N, where each sub-portion 312 corresponds to a specific storage format. Next, in block 512, a second code portion 320 is installed in the disk drive 30, wherein the second code portion 320 is executable by the disk drive control system 33 for each of the format-specific sub-portions 312. In one embodiment, the first code portion 310 and the second code portion 320 are installed in firmware 110 of the control system 33 as shown in FIG. 3.

Next, in block 513, a format-selection parameter 330 is selected by the remote host. In one embodiment, the remote host is the factory host 200 (shown in FIG. 2) communicating with the control system 33 via host bus connector 38. The format-selection parameter 330 relates to a selected format-specific sub-portion, such as sub-portion_2.

Next, in block 514, the format-selection parameter 330 is received by the control system 33 from the remote host. The format-selection parameter 330 relates to a selected format-specific sub-portion 312, such as sub-portion_2, and causes the control system 33 to configure the firmware code image 300 from the second code portion 320 and the selected format-specific sub-portion 312, such as sub-portion_2.

Next, in block 516, the control system 33 is initialized to execute the configured firmware code image 300, with the execution configuring the control system 33 to support the targeted storage format. In one embodiment of the invention, the storage format is determined by a bit per inch storage parameter. In another embodiment, the storage format is determined by a disk-storage capacity parameter. In yet another embodiment the storage format is determined by a track per inch storage parameter. The self-servo writing details and advantages associated with the use of a track per inch storage parameter are described in the above referenced patent application.

Next, in decision block 518, it is determined whether another storage format maybe needed for the disk drive 30. If another storage format is needed, then the process flow returns to block 513, wherein second a format-selection parameter 330 is selected by the remote host, such as the factory host 220 (shown in FIG. 2). The second format-selection parameter 330 relates to a second selected format-specific sub-portion 312, such as sub-portion_3, and causes the control system 33 to configure a second firmware code image 300 from the second code portion 320 and the selected second format-specific sub-portion 312. Next, in block 516, the control system 33 is initialized to execute the second configured firmware code image 300.

In one embodiment of the invention (not shown in FIG. 3), the method further includes receiving a set of execution results from the control system 33 by the remote host, and determining (by the remote host) from the received results a pattern of execution success and/or execution failure corresponding to each of the selected format-selection parameters 330.

Returning to decision block 518, if it is determined that another storage format is not needed for the disk drive 30, such as because the configuration of the control system 33 was successful or the disk drive 30 is being removed from the configuring process, then the flow proceeds to block 520 in which the process ends.

One advantage of the foregoing feature of the present invention over the prior art is that by installing on the disk drive 30 the first and second code portions from which the firmware image code 300 is configured, the need for the downloading of the firmware image codes from the factory host 200 is minimized. The factory host 200 can then make the selection process without having to download a preconfigured firmware image code into the test system 210, via the communication medium 205. In addition, by configuring each firmware image code 300 from the first and second code portions on a per need basis, the otherwise need for pre-configuring all versions of the firmware image code 300 and allocation of a much larger memory area for their storage can be minimized.

Figure 6:
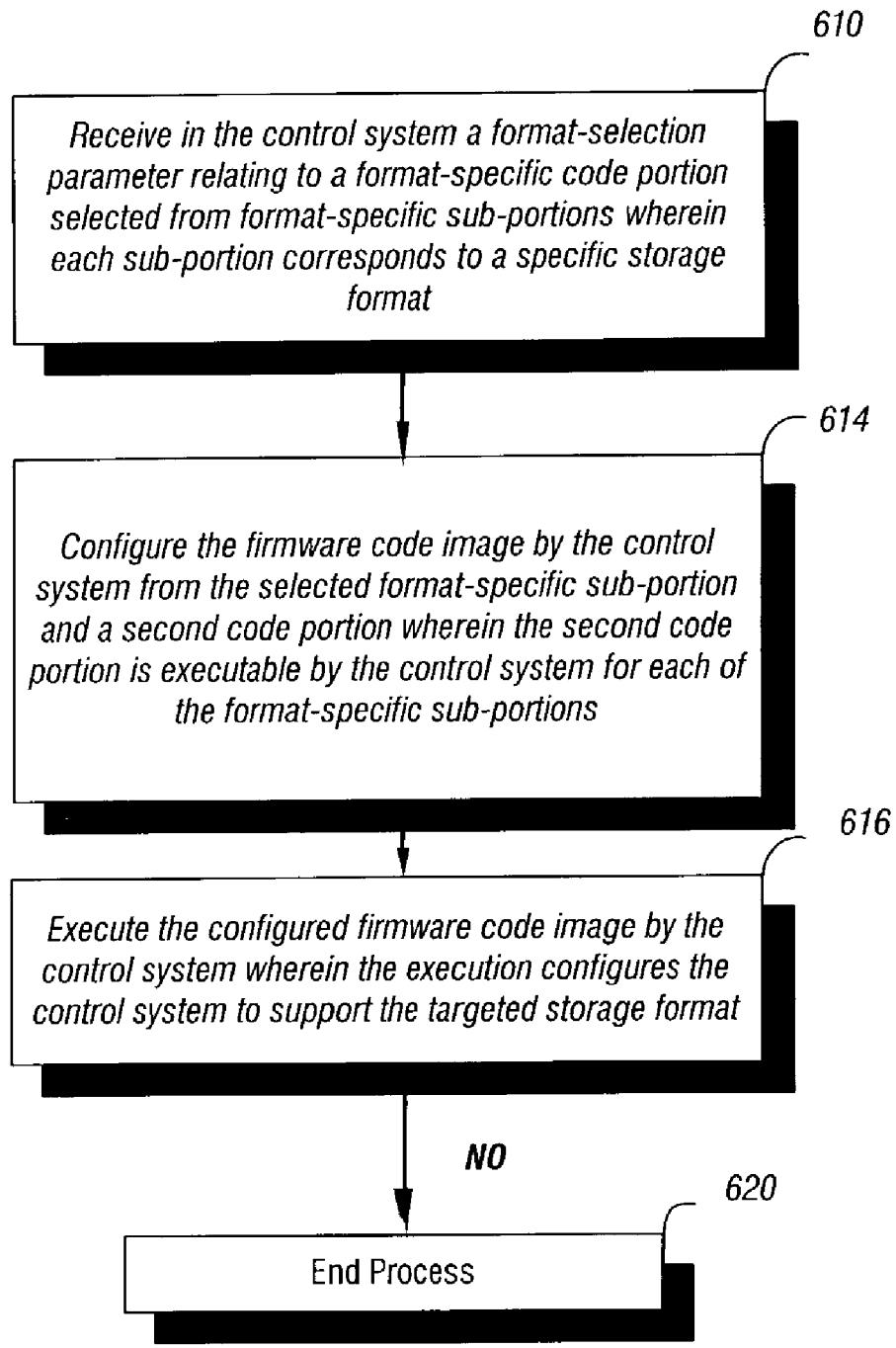
FIG. 6 is a flow chart illustrating a process used in yet another embodiment of the invention.

Referring to FIG. 6 in conjunction with FIG. 3, a method for configuring a disk drive 30 to support a targeted storage format for at least one surface of a disk 46 (shown in FIG. 1) on the disk drive 30 is disclosed. As shown in FIG. 3 the disk drive 30 comprises a disk drive control system 33 for executing a firmware code image 300 corresponding to the targeted storage format.

Starting at block 610 of FIG. 6, the method includes receiving in the control system 33 a format-selection parameter 330 relating to a format-specific code portion 312, such as sub-portion_2, selected from a plurality of format-specific sub-portions 312 wherein each sub-portion 312 corresponds to a specific storage format.

Next, in block 614, a firmware code image 300 is configured by the control system 33 from the selected format-specific sub-portion 312, such as sub-portion_2, and a second code portion 320 wherein the second code portion 320 is executable by the control system 33 for each of the format-specific sub-portions 312. In one embodiment, the first code portion 310 and the second code portion 320 reside in firmware 110 of the control system 33 shown in FIG. 3.

Next, in block 616, the configured firmware code image 300 is executed by the control system 33 wherein the executing configures the control system 33 to support the targeted storage format. The flow proceeds to block 620 in which the process ends.

One advantage of the foregoing feature of the present invention over the prior art is that by configuring the firmware image code 300 from the first and second code portions on a per need basis, the need for the downloading of the firmware image codes from the factory host 200 is minimized. In addition, by configuring each firmware image code 300 from the first and second code portions on a per need basis, the otherwise need for pre-configuring all versions of the firmware image code 300 and allocation of a much larger memory area for their storage can be minimized.

It should be noted that the various features of the foregoing embodiments were discussed separately for clarity of description only and they can be incorporated in whole or in part into a single embodiment of the invention having all or some of these features.

What is claimed is:

1. A method for configuring a disk drive to support a targeted storage format for at least one surface of a disk on the disk drive, wherein the disk drive comprises at least one disk and a disk drive control system for executing a first firmware code image corresponding to the targeted storage format, the method comprising:
   installing a first code portion in the disk drive, the first code portion comprising a plurality of format-specific sub-portions wherein each sub-portion corresponds to a specific storage format;
   installing a second code portion in the disk drive, wherein the second code portion is executable by the disk drive control system for each of the format-specific sub-portions;
   receiving a first format-selection parameter by the control system, wherein the first format-selection parameter relates to a selected first format-specific sub-portion and causes the control system to configure the first firmware code image from the second code portion and the selected first format-specific sub-portion; and
   initializing the control system to execute the configured first firmware code image wherein the execution configures the control system to support the targeted storage format.

2. The method as claimed in claim 1, further comprising:
   receiving a second format-selection parameter by the control system, wherein the second format-selection parameter relates to a selected second format-specific sub-portion and causes the control system to configure a second firmware code image from the second code portion and the selected second format-specific sub-portion; and
   initializing the control system to execute the configured second firmware code image.

3. The method as claimed in claim 2, wherein each format-selection parameter is received by the control system from a remote source.

4. The method as claimed in claim 3, wherein the remote source is a remote host.

5. The method as claimed in claim 3, wherein the remote source is a local host.

6. The method as claimed in claim 2, wherein at least one of the format-selection parameters is received with a vendor specific command.

7. The method as claimed in claim 2, wherein at least one of the format-selection parameters is received by the control system from a characterization process executing on the disk drive.

8. The method as claimed in claim 1, wherein the storage format is determined by a bit per inch storage parameter.

9. The method as claimed in claim 1, wherein the storage format is determined by a track per inch storage parameter.

10. The method as claimed in claim 1, wherein the storage format is determined by a disk-storage capacity parameter.

11. The method as claimed in claim 1, wherein the disk drive control system comprises a disk drive controller microprocessor.

12. A method of manufacturing a disk drive wherein a remote host causes the configuring of the disk drive to support a targeted storage format for at least one surface of a disk on the disk drive, wherein the disk drive comprises at least one disk and a disk drive control system for executing a first firmware code image corresponding to the targeted storage format, the method comprising:

installing a first code portion in the disk drive, the first code portion comprising a plurality of format-specific sub-portions wherein each sub-portion corresponds to a specific storage format;

installing a second code portion in the disk drive, wherein the second code portion is executable by the disk drive control system for each of the format-specific sub-portions;

selecting a first format-selection parameter by the remote host wherein the first format-selection parameter relates to a selected first format-specific sub-portion;

receiving the first format-selection parameter by the control system from the remote host wherein the first format-selection parameter causes the control system to configure the first firmware code image from the second code portion and the selected first format-specific sub-portion, and initializing the control system to execute the configured first firmware code image wherein the execution configures the control system to support the targeted storage format.

13. The method as claimed in claim 12, further comprising:

selecting a second format-selection parameter by the remote host wherein the second format-selection parameter relates to a second format-specific sub-portion;

receiving the second format-selection parameter by the control system from the remote host wherein the second format-selection parameter causes the control system to configure a second firmware code image from the second code portion and the selected second format-specific sub-portion, and initializing the control system to execute the configured second firmware code image.

14. The method as claimed in claim 13, further comprising:

receiving a set of execution results from the control system by the remote host; and determining from the received results at least one of a pattern of execution success and execution failure corresponding to each of the selected format-selection parameters.

15. The method as claimed in claim 12, wherein the storage format is determined by a bit per inch storage parameter.

16. The method as claimed in claim 12, wherein the storage format is determined by a track per inch storage parameter.

17. The method as claimed in claim 12, wherein the storage format is determined by a disk-storage capacity parameter.

18. The method as claimed in claim 12, wherein the first format-selection parameter is received with a vendor specific command.

19. The method as claimed in claim 12, wherein the disk drive control system comprises a disk drive controller microprocessor.

20. A method for configuring a disk drive to support a targeted storage format for at least one surface of a disk on the disk drive, wherein the disk drive comprises a disk drive control system for executing a first firmware code image corresponding to the targeted storage format, the method comprising:

receiving in the control system a format-selection parameter relating to a format-specific code portion selected from a plurality of format-specific sub-portions wherein each sub-portion corresponds to a specific storage format;

configuring the firmware code image by the control system from the selected format-specific sub-portion and a second code portion wherein the second code portion is executable by the control system for each of the format-specific sub-portions; and executing the configured firmware code image by the control system wherein the executing configures the control system to support the targeted storage format.

* * * * *